US United States Patent [19]

Schwarz

[11] 4,373,075
[45] Feb. 8, 1983

[54] FROZEN EMULSION INITIATION OF POLYOL (ALLYL CARBONATE)

[75] Inventor: Richard A. Schwarz, Akron, Ohio

[73] Assignee: PPG Industries, Inc., Pittsburgh, Pa.

[21] Appl. No.: 330,424

[22] Filed: Dec. 14, 1981

[51] Int. Cl.$^3$ ............................................. C08L 45/00
[52] U.S. Cl. .................................. 526/230.5; 526/314
[58] Field of Search ............................. 526/314, 230.5

[56] References Cited

U.S. PATENT DOCUMENTS 2,370,565 2/1945 Muskat et al. .......................... 260/78
3,988,261 10/1976 Barter et al. .......................... 252/431

Primary Examiner—Joseph L. Schofer
Assistant Examiner—Bernard Lipman
Attorney, Agent, or Firm—Richard M. Goldman

[57] ABSTRACT

Disclosed is the peroxide initiated polymerization of polyol(allyl carbonate) by forming a composition of the monomer and an emulsion of the initiator, breaking the emulsion, removing a water-containing coagulum, and thereafter carrying out the polymerization.

24 Claims, No Drawings

FROZEN EMULSION INITIATION OF POLYOL (ALLYL CARBONATE)

DESCRIPTION OF THE INVENTION

Polyol(allyl carbonates) are polymerized by the formation of free radicals by organic peroxide polymerization initiators. Concommitant with the utility of organic peroxides as free radical polymerization initiators is the thermal instability of these organic perioxides, necessitating special precautions in the handling thereof.

U.S. Pat. No. 3,825,509 to Miller for INITIATOR EMULSION FOR OLEFINIC POLYMERIZATION REACTIONS disclosed an organic peroxide aqueous emulsion in which the peroxide is present in an amount up to 19 percent by weight. The surfactant used is a combination of polyvinyl alcohol and polyoxyethylene sorbitan monolaurate. After the organic peroxide aqueous emulsion is prepared, it is added to the polymerization reaction vessel to initiate polymerization of the ethylenically unsaturated material. The emulsion is disclosed to be useful for those polymerization reactions which are conducted in an aqueous medium, e.g., emulsion or suspension polymerizations of vinyl or vinylidene halide monomers. To insure that the disclosed emulsions are not broken by standing, agitation is applied to the emulsion to maintain its stability.

U.S. Pat. No. 3,988,261 to Barter et al for FROZEN ORGANIC PEROXIDE EMULSION discloses a solid, frozen organic peroxide emulsion comprising an organic peroxide, an emulsifying amount of a surfactant, and water, characterized by stability of the emulsion to freezing and thawing.

Organic peroxide emulsions as described in the aforementioned patents are particularly useful in polymerizations carried out in aqueous media, i.e., solution polymerizations suspension polymerizations, and emulsion polymerizations, especially such polymerizations where the emulsifier enhances the properties of the polymer, e.g., as a plasticizer.

However, in the case of bulk polymerizations, especially bulk polymerizations where the presence of water is deleterious to the properties of the resulting polymer or where the monomer is insoluble in water, e.g., polymerization of polyol (allyl carbonates), the emulsion must be broken. That is, the dispersed organic peroxide phase must be separated from the continuous aqueous phase. However, phase separation can be a dangerous industrial process because of the presence of concentrated organic peroxide. Decomposition of the phase separated, concentrated organic peroxide can result in heat, the liberation of flammable gases, and fire.

It has now been found that phase separation of the organic initiator peroxide emulsion to obtain neat organic peroxide initiator may be avoided, and that the polyol (allyl carbonate) monomer may be added to the emulsion, the emulsion inverted, the surfactant is coagulated in the aqueous phase and thereafter separated, and the bulk polymerization of the polyol (allyl carbonate) thereafter carried out under substantially anhydrous conditions.

DETAILED DESCRIPTION OF THE INVENTION

The present invention is directed to the polymerization of polyol(allyl carbonate) monomers utilizing aqueous emulsions or suspensions of organic peroxide polymerization initiators. The polyol (allyl carbonate) monomer is admixed with the aqueous emulsions or supension, the emulsion or suspension is inverted from an "oil in water" emulsion to a "water in oil" emulsion whereby the aqueous phase becomes the dispersed phase and the organic phase becomes the continuous phase, the aqueous phase and surfactant are separated therefrom, and the polymerization is carried out.

The method of the present invention is carried out by admixing a substantially water insoluble polyol(allyl carbonate) and an emulsion or suspension comprising organic peroxide dispersed by a suitable surfactant in a continuous aqueous phase. The resulting composition, an emulsion or suspension of an organic phase dispersed in a continuous aqueous phase,, is then inverted. That is, it is converted into an emulsion or suspension of a discontinuous aqueous phase dispersed in a continuous organic phase.

A coagulant is then added to the inverted emulsion or suspension. The coagulant is a material that reacts with the surfactant of the original emulsion, e.g., cross-linking the surfactant, thereby to coagulate, flocculate, or precipitate the surfactant.

The coagulum, floc, or precipitate is then physically separated from the continuous, organic phase, e.g., by filtration, decantation, centrifugarion or the like.

In a particularly preferred exemplification the organic phase is dried. The drying may be carried out simultaneously with phase separation or subsequent to phase separation.

After phase separation, or after drying, if carried out subsequently to phase separation, the organic peroxide initiated polymerization of the poly(allyl carbonate) is carried out.

The emulsion or suspension of organic peroxide initiator and surfact in water may be a liquid emulsion, a frozen emulsion, a liquid suspension, or a frozen suspension. The terms "emulsion" and "suspension" are used interchangeably herein, the invention not residing in the size of the dispersed elements of the dispersed phase. By frozen emulsions and suspensions are meant frozen aqueous emulsions and suspensions of organic peroxides having moderate to high concentrations of organic peroxide, i.e., from about 30 to about 75 weight percent organic peroxide, basis total weight of the frozen emulsion or suspension, that can be frozen without separation of the dispersed organic peroxide phase and the continuous aqueous phase, that when thawed retain their emulsified state for a period of time sufficient to allow safe handling and use, that are resistant to phase separation after numerous freeze-thaw cycles, and that are solids, commonly particulate or "popcorn" solids.

The organic peroxide initiators useful in the method of this invention include organic peroxydicarbonate esters, organic diacyl peroxides, organic acyl sulfonyl peroxides, and organic peroxy esters. Preferably the organic peroxide initiators are liquids at temperatures between 20° C. and 40° C.

The organic peroxydicarbonate esters are represented by the following empirical formula:

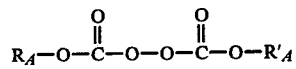

where $R_A$ and $R_A'$ are aliphatic radicals of from 1 to 20, preferably from 2 to 12, more particularly from 2 to 8, e.g., 3 to 4 carbon atoms or an aromatic radical of from 6 to 8 carbon atoms. In a preferred exemplification, $R_A$ and $R_A'$ are independently selected from the group consisting of methyl, ethyl, n-propyl, isopropyl, n-butyl, isobutyl, secondary butyl, tertiary butyl, capryl, 2-ethylhexyl, benzyl, cyclohexyl, and 4-tertiary butyl cyclohexyl radicals.

The diacyl peroxides are represented by the following empirical formula:

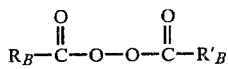

where $R_B$ and $R_B'$ are aliphatic radicals of from 1 to 20, particularly 1-12, and more particularly from 1 to 4 carbon atoms or an aromatic radical of from 6 to 8 carbon atoms. In a preferred exemplification, $R_B$ and $R_B'$ are independently selected from the group consisting of the methyl, ethyl, n-propyl, isopropyl, n-butyl, secondary-butyl, tertiary-butyl, etc. radical. Particularly preferred are diacetyl peroxide, dibenzoyl peroxide, dilauroyl peroxide and diisobutyryl peroxide.

The acyl sulfonyl peroxides, e.g., acetyl sulfonyl, peroxides, are represented by the empirical formula:

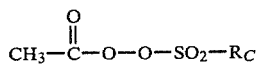

where $R_C$ is an aliphatic radical of from 4 to 12 carbon atoms or a cycloaliphatic radical of from 3 to 10, e.g., 3 to 6, carbon atoms. $R_C$ can be cyclobutyl, cyclopentyl, cyclohexyl, n-butyl, sec-butyl, secondary heptyl, secondary dodecyl, secondary decyl, etc.

The peroxyesters are the alkyl esters of peroxycarboxylic acids of from 2 to about 12 carbon atoms. The alkyl ester portion of the peroxyester usually contains 4 carbon atoms. e.g., tertiary butyl radical but can contain less or more carbon atoms. The peroxyesters are represented by the general formula:

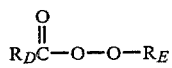

where $R_D$ is an aliphatic radical of from 1 to 12, e.g., 5 to 10, carbon atoms of an aromatic radical and $R_E$ is an aliphatic radcal of from 1 to 8, e.g., 4 carbon atoms. Examples include tertiary butyl peroxypivalate, tertiary butyl peroctoate and tertiary butyl perneodecanoate.

In the liquid emulsions and suspensions herein contemplated the content of organic peroxide initiator is from about 2 weight percent to about 75 weight percent, basis total weight of emulsion, while in the frozen emulsions, and suspensions herein contemplated the content of organic peroxide initiator is from about 30 weight percent to about 75 weight percent, basis total weight of the emulsion.

The emulsion or suspension is established and maintained by the surfactant. Surfactants are characterized by the presence of hydrophilic and hydrophobic moieties on the same molecule. Surfactants are categorized by their hydrophilic functionality, i.e., anionic surfactants, non-ionic surfactants, and cationic surfactants. Preferred are non-ionic surfactants, e.g., ethoxylated alkyl phenols, carboxylic amides, polyoxyalkylene oxide block copolymers, water soluble cellulose ethers and polyvinyl alcohol. Polyvinyl alcohol is the hydrolysis product of a vinyl acetate polymer, preferably having at least 65 percent hydrolysis, and a molecular weight of 11,000 to 1,500,000.

Typically the emulsion or suspension will contain from 1 to 10 weight percent emulsifier, i.e. surfactant. The exact amount of surfactant required can be ascertained easily by simple experimental techniques using the aforementioned ranges as a guideline. Since surfactants are relatively expensive materials, only that amount which is required to accomplish the desired result (as described hereinbefore) are used commonly.

The surfactant should be soluble in the water phase to the extent required to perform the intended function, and should remain dissolved in the water phase at all temperatures at which the emulsion is stored either as a frozen emulsion or as a liquid emulsion.

The amount of initiator emulsion or suspension admixed with the polyol (allyl carbonate) will provide on a neat basis sufficient initiator to polymerize the polyol (allyl carbonate). This is generally from about 0.005 mole of organic peroxide initiator per equivalent of allyl carbonate functionality.

The emulsion or suspension and the polyol (allyl carbonate) are vigorously agitated to invert the emulsion or suspension, that is, to convert the "organic dispersed in aqueous" emulsion or suspension into an "aqueous dispersed in organic" emulsion or suspension. The energy and duration of agitation may be determined by routine experimentation.

Therefore a coagulant is added to the "aqueous dispersed in organic" emulsion or suspension to coagulate the aqueous phase. The coagulant may be a cross linking agent that chemically bonds the hydrophilic groups of the surfactant, whereby to thicken and gel the surfactant. For example, polycarboxyls, polycarbonyls, or glyoxal may be used as organic coagulants. Alternatively, borax, boric acid, and alkali metal borates, e.g., sodium or potassium tetraborate, pentaborate, or hexaborate, may be utilized to cross link the alcohol groups of polyvinyl alcohol. For Borax, $Na_2B_4O_7 \cdot X H_2O$, were X is from 1 to 10, and most commonly about 7, is especially preferred for reasons of cost, effectiveness, and commercial availability. Alternatively ionic coagulants, e.g., salts of $SO_4^=$, $CO_3^=$, $PO_4^=$, $SO_3^=$, $HSO_3^-$, and the like may be used, either alone or in admixture with organic materials, as glyoxal.

The amount of coagulant is sufficient to coagulate the surfactant and aqueous phase. For an emulsion or suspension stabilized by poly(vinyl alcohol), with borax or boric acid as the coagulant, 0.07 equivalent of borax per equivalent of alcohol to 0.7 equivalent of borax per equivalent of alcohol has been found to be satisfactory.

Completeness of separation including enhancement of floc formation and avoidance of sponge formation is favored by high shear rates. Coagulation times of from about 20 minutes to about 24 hours in combination with high shear rates gives satisfactory separation. Preferably the coagulant is added slowly, i.e. several additions of about 1 to 2 minutes duration, over the course of the coagulation.

Drying may be carried out during separation, as by maintaining a desiccant or hygroscopic material, e.g., silica gel, in contact with the vapor space during coagulaton. Alternatively, a substantially non-reactive, dry, drying gas, e.g., dry nitrogen, dry argon, dry helium, dry carbon dioxide, or mixtures thereof, may be passed through the composition during coagulation. By a "non-reactive" gas is meant a gas that does not chemically react with the surfactant, initiator, or monomer, or interfere with the polymerization. By a "dry" gas is meant a gas having an absolute humidity and a relative humidity low enough to evaporate and carry away water. Alternatively, drying may be carried out after coagulation and separation, e.g., by contacting the water wet organic phase with a desiccant, hygroscopic material or drying agent, such as silica gel. Generally, when the water wet organic liquid phase is contacted with a disiccant, e.g., silica gel, the amount of desiccant is from about 5 to about 35 weight percent, basis weight of the organic liquid. Care must be exercised in the selection of the drying agent so that the presence of the drying agent does not induce decomposition of the released initiator.

The operations of mixing the initiator emulsion with the monomer to form a second emulsion of monomer and initiator, inverting the second emulsion, coagulating the aqueous phase, separating the coagulum, and drying, should be carried out at temperatures above the melting point of the frozen emulsion, i.e., above about 0 degrees Centigrade, but low enough to avoid substantial decomposition of the peroxide initiator, i.e., below about 35 degrees Centigrade for secondary-butyl peroxydicarbonate.

Thereafter polymerization may be carried out by methods well known in the art.

Polyol (allyl carbonates) which may be polymerized by the method herein described comprising the admixture of a monomer and an emulsion of an initiator in water include mono-functional allyl carbonates, diol bis(allyl carbonates), triol tris(allyl carbonates), tetra kis(allyl carbonates), and higher polyol(allyl carbonates).

Diol bis (allyl carbonate) monomers which may be polymerized by the method of this invention are normally liquid allyl carbonates, and, most commonly, are aliphatic diol bis (allyl carbonates) i.e., glycol bis (allyl carbonate) compounds, in which the allyl groups may be substituted at the 2 position with a halogen, notably chlorine or bromine, or a 1 to 4 carbon alkyl group, generally a methyl or ethyl group, and the glycol group may be an alkylene, alkylene ether, alkylene polyether, alkylene carbonate, or alkylene polyether group having from 2 to 10 carbons and oxygens. These diol bis (allyl carbonate) monomers are represented by the formula:

$$R_1-O-\overset{O}{\underset{\|}{C}}-O-R_2-O-\overset{O}{\underset{\|}{C}}-O-R_3$$

where $R_1$ and $R_3$ are allyl or substituted allyl groups, and $R_2$ is as defined below. $R_1$ and $R_3$ are independently represented by the formula:

$$H_2C=\underset{\underset{R^1}{|}}{C}-CH_2-$$

where $R^1$ may be hydrogen, halogen, or a 1 to 4 carbon alkyl group. Specific examples of $R_1$ and $R_3$ include allyl, 2-chloroallyl, 2-bromoallyl, 2-iodoallyl, 2-fluoroallyl, 2-methallyl, 2-ethylallyl, 2-isopropylallyl, 2-n-propylallyl, and 2-n-butylallyl groups. Most commonly, $R_1$ and $R_3$ are allyl groups, $H_2C=CH-CH_2-$. Such compounds and methods for making them are disclosed in U.S. Pat. No. 2,370,567 and 2,403,113.

Specific examples of $R_2$ are alkylene groups such as ethylene, trimethylene, methylethylene, tetramethylene, ethylethylene, pentamethylene, hexamethylene, 2-methylhexamethylene, octamethylene, and decamethylene groups, alkylene ether groups such as $-CH_2-O-CH_2-$, $-CH_2CH_2-O-CH_2CH_2-$, $-CH_2-O-CH_2-CH_2-$, and $-CH_2CH_2CH_2-O-CH_2CH_2CH_2-$, alkylene polyether groups such as $-CH_2CH_2-O-CH_2CH_2-O-CH_2CH_2-O-CH_2O-CH_2CH_2-$, and $CH_2-O-CH_2-$ groups, and alkylene carbonate and alkylene polycarbonate groups such as $CH_2CH_2-O-CO-O-CH_2CH_2$ and $-CH_2CH_2-O-CH_2CH_2-O-CO-O-CH_2CH_2-OCH_2CH_2-$ groups. Most commonly, $R_2$ is $-CH_2CH_2-$, $-CH_2CH_2-O-CH_2CH_2-$, or $-CH_2CH_2-O-CH_2CH_2-O-CH_2CH_2$.

Specific examples of the diol bis (allyl carbonate) monomers useful in carrying out the method herein contemplated include the commercially important diol bis (allyl carbonate) monomers which may be polymerized by the method herein contemplated are:

$$CH_2=CH-CH_2-O-\overset{O}{\underset{\|}{C}}-O-CH_2-CH_2-O-CH_2CH_2-O-CH_2CH_2-O-\overset{O}{\underset{\|}{C}}-O-CH_2CH=CH_2,$$

$$CH_2=CH-CH_2-O-\overset{O}{\underset{\|}{C}}-O-CH_2CH_2-O-CH_2CH_2-O-\overset{O}{\underset{\|}{C}}-OCH_2-CH=CH_2, \text{ and}$$

$$CH_2=CH-CH_2-O-\overset{O}{\underset{\|}{C}}-O-CH_2CH_2-O-\overset{O}{\underset{\|}{C}}-O-CH_2-CH=CH_2.$$

Additional examples of diol bis (allyl carbonate) monomers useful in carrying out the method herein contemplated include ethylene glycol bis (2-chloroallyl carbonate), diethylene glycol bis (2-methallyl carbonate), triethylene glycol bis (allyl carbonate), propylene glycol bis (2-ethylallyl carbonate), 1,3-propanediol bis (allyl carbonate), 1,3-butanediol bis (allyl carbonate), 1,4-butanediol bis (2-bromoallyl carbonate), dipropylene glycol bis (allyl carbonate), trimethylene glycol bis (2-ethylallyl carbonate), and pentamethylene glycol bis (allyl carbonate).

Triol tris(allyl carbonates) which may be polymerized by the method of this invention, either homopolymerized or copolymerized, e.g., with diol bis(allyl carbonates), are represented by the formula $$R_4(O\overset{O}{\underset{\|}{C}}O-CH_2CH=CH_2)_n$$

with n=3 where $R_4$ is an organic moiety chosen from the group consisting of moieties derived from polyols and extended polyols, most frequently a triol or extended triol where the hydroxyl groups of the precursor polyol $R_4(OH)_n$ are non-vicnal.

While the functionality indicated above is tris functionality, it is to be understood that in higher polyols n is greater than 2, e.g., above about 2.2, representing a mixture of diols and higher polyols, to about 8 representing a derivative of trimeric pentaerythritol. By "non-vicinal" it is meant that the hydroxyl groups are not on adjacent carbons. Specific triol precursors useful in preparing the tris(allyl carbonate) materials useful in this invention are triols with primary or secondary hydroxyl groups. Triols having primary hydroxyl groups are preferred precursors. One such class of triols are 1,1,1-trimethylol alkanes. Also useful are extended trimethylol alkyl tris(allyl carbonate) monomers such as lactone extended trimethylol alkanes and alkyl oxide extended trimethylol alkanes. By an extended triol is meant the reaction product having terminal hydroxyl groups of the triol and a suitable reactant, e.g., an alkyl oxide or a lactone. Typical lactone extended trimethylol alkanes include -caprolactone extended trimethylol methane, -caprolactone extended trimethylol ethane, -caprolactone extended trimethylol propane, and -caprolactone extended trimethylol butane. Typical alkyl oxide extended triols include ethylene oxide extended trimethylol methane, ethylene oxide extended trimethylol ethane, ethylene oxide extended trimethylol propane, ethylene oxide extended trimethylol butane, propylene oxide extended trimethylol methane, propylene oxide extended trimethylol methane, propylene oxide extended trimethylol ethane, propylene oxide extended trimethylol butane.

The preferred polyols meeting these requirements have the general formula $R_4(OH)_n$ where n is greater than 2 up to about 8 and generally is about 3. $R_4$ can be

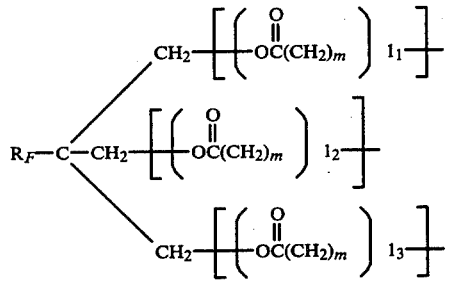

where $R_F$ is H, —$CH_3$, —$CH_2CH_3$—, —$CH_2CH_2CH_3$, or —$CH_2CH_2CH_3$, and $l_1$, $l_2$ and $l_3$ are each integers from 0 to 5 and the sum of $l_1+l_2+l_3$ is 2 or more and generally from 2 to 8, although values as high as 15 are possible. The value of m depends on the lactone utilized to extend the polyol and is generally 4 or 5.

The chain extending lactone may be a delta lactone having the formula

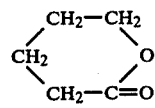

which can be substituted with hydrogen, methyl groups, or ethyl groups.

According to a still further exemplification, the chain extending lactone group can be an epsilon lactone having the formula:

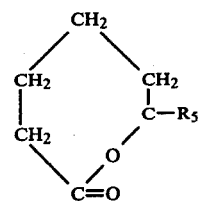

where $R_5$ is hydrogen, a methyl group, or an ethyl group and where $R_5$ can be on any of the carbons other than the carbonyl carbon. One exemplary triol is Union Carbide Corporation NIAX® PCP-0301 brand epsilon-caprolactone extended trimethylol propane.

According to a still further exemplification, $R_4$ can be

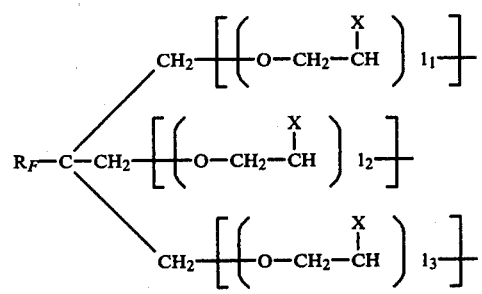

where $R_F$ is as defined previously, $l_1$, $l_2$ and $l_3$ are integers from 0 to 5 and the sum of $l_1+l_2+l_3$ is 2 or more and generally from about 2 to 8, although values as high as about 15 are possible, and X is H or $CH_3$. The chain extenders may be ethylene oxide groups as exemplified by Upjon ISONOL® 93 ethylene oxide extended trimethylol propane. Alternatively, the extenders may be propylene oxide groups as in BASF-Wyandotte PLURACOL TP brand propoxylated trimethylol propane.

According to a still further exemplification, $R_4(OH)_3$ may be an extended glycerol, for example, ethylene oxide extended glycerol having the general formula:

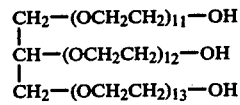

or propylene oxide extended glycerol having the formula:

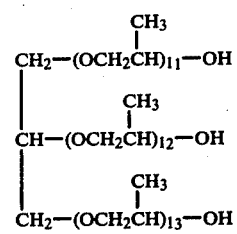

or a lactone extended glycerol having the formula:

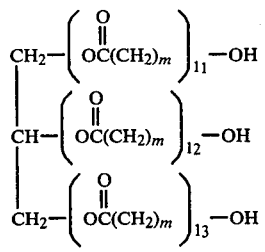

where m and $1_1$, $1_2$, and $1_3$ are as defined above. Typical propoxylated glycerines include DOW VORANOL 2025 brand propoxylated glycerine having a molecular weight of about 260 grams per gram mole, DOW VORANOL 2070 brand propoxylated glycerine having a molecular weight of about 700 grams per gram mole, and BASF-Wyandotte PLURACOL GP730 brand propoxylated glycerine having a molecular weight of about 730 grams per gram mole.

The following examples are illustrative.

EXAMPLE I

A series of tests were run in which a frozen emulsion of secbutyl peroxy dicarbonate was added to diethylene glycol bis (allyl carbonate), stirred, and borax, $Na_2B_4O_7 \cdot X\ H_2O$, where x is from 0 to 10, and most commonly 7, was added to the stirred composition, with continued stirring, whereby to form a coagulum. The coagulum was removed by vacuum filtration. The resulting filtrate was dried by stirring with silica gel with subsequent removal of the silica gel.

In each test 350 grams of neat PPG CR-39 ® diethylene glycol bis (allyl carbonate) monomer and 35 grams of a frozen emulsion of 14 grams of sec-butyl peroxydicarbonate, and 1.4 grams of polyvinyl alcohol surfactant, in 19.6 grams of water with water as the continuous phase, were mixed in a 500 milliliter Erlenmeyer (wide mouth) flask and stirred with a 0.5 inch by 3 inch (12 millimeter by 72 millimeter) magnetic stir bar for 5 to 20 minutes, during which time the frozen emulsion melted and dispersed and the inverted emulsion was formed.

Thereafter 2.1 grams of borax, $Na_2B_4O_7 \cdot X\ H_2O$, where X is about 7, was added to the composition, with stirring continued for the time shown in Table I, below, under "Coagulation Time".

In the test 20 minutes coagulation time, the frozen emulsion was in the form of a uniform solid frozen mass and the borax was added substantially uniformly over a period of about two minutes after the frozen emulsion had melted and dispersed. A spongy, compressible coagulum was obtained.

In the tests at 30 minutes coagulation time, frozen emulsion was added as a uniform solid mass and the borax was added instantaneously after the frozen emulsion had melted and dispersed. The resulting coagulum was spongy and evidenced gross agglomeration.

In the test 40 minutes coagulation time, the frozen emulsion was in the form of individual frozen particles and the borax was added substantially uniformly over a period of two minutes after the frozen emulsion had melted and dispersed. A spongy, compressible coagulum was obtained.

In each test the composition of coagulum and liquid was separated in a coarse glass fritted funnel. Thereafter each filtrate was mixed with 20 weight percent silica gel, basis weight of filtrate, and stirred for the time shown under "Drying Time" in Table I, below.

The results obtained are shown under "PRODUCT" in Table I, below. The concentration of sec-butyl peroxy dicarbonate was determined by iodiometric titration with N,N-dimethyl aniline. Residual water was determined by the Karl-Fischer method, after the sec-butyl peroxy dicarbonate had been destroyed by titration with N,N-dimethyl aniline.

TABLE I

Borax, $Na_2B_4O_7 \cdot 10\ H_2O$, Coagulation of Polyvinyl Alcohol From Frozen Emulsion Sec-Butyl Peroxydicarbonate In Diethylene Glycol Bis (Allyl Carbonate)

| BREAKING EMULSION | | DRYING | | PRODUCT | | |
|---|---|---|---|---|---|---|
| Grams of borax per gram of polyvinyl alcohol | Coagulation Time (minutes) | Grams of silica gel per gram of monomer | Drying Time (minutes) | Percent recovery of monomer | Sec-Butyl Peoxy Dicarbonate-wt. % | Water wt. % |
| 1.5 | 20 | — | — | 86.5 | 0.90 | not determined |
| 1.5 | 20 | 0.2 | 10 | — | 0.83 | 0.28 |
| 1.5 | 20 | 0.2 | 20 | — | 0.93 | 0.19 |
| 1.5 | 20 | 0.2 | 30 | — | 0.83 | 0.21 |
| 1.5 | 30 | — | — | 80.3 | 1.06 | not determined |
| 1.5 | 30 | 0.2 | 10 | — | 1.08 | 0.22 |
| 1.5 | 30 | 0.2 | 20 | — | 1.10 | 0.21 |
| 1.5 | 30 | 0.2 | 30 | — | 1.10 | 0.19 |
| 1.5 | 40 | — | — | 82.8 | 0.49 | not determined |
| 1.5 | 40 | 0.2 | 10 | — | 0.48 | 0.44 |
| 1.5 | 40 | 0.2 | 20 | — | 0.49 | 0.23 |
| 1.5 | 40 | 0.2 | 30 | — | 0.55 | 0.19 |

EXAMPLE II

The procedure of Example I, above, was followed, except that stirring was carried out by the replacement of the magnetic stirrer with a Fisher Dyna Mix stirrer motor having a four bladed stirrer, and all quantities were halved.

The frozen emulsion was in the form of a solid frozen mass. After stirring to melt and disperse the frozen initiator, 1.5 grams of borax per gram of polyvinyl alcohol were added over a period of two minutes. The coagulation time was 30 minutes. The filtrate obtained from removal of the coagulum was not dried. The percent recovery of diethylene glycol bis (allyl carbonate) was 78.6 percent. The sec-butyl peoxy dicarbonate content was 3.59 weight percent, and the water content was 1.00 weight percent, both basis total liquid composition.

EXAMPLE III

Two tests were run using the starting materials and following the procedure of Example I, above, except that water was continuously removed from the system.

A 500 milliliter wide mouth Erlenmeyer flask was modified by affixing a 45/50 inner joint to the neck. A 45/50 outer joint was modified by sealing the end and affixing a glass hook to the inside of the sealed end. The sealed outer joint was utilized as the cap of the flask. A 28 millimeter by 80 millimeter extraction thimble was filled with silica gel and suspended from the hook by a nichrome wire.

In the test, 150 grams of PPG CR-39 ® diethylene glycol bis (allyl carbonate) and 15 grams of the frozen initiator emulsion were placed in the flask. The composition was stirred for one hour to invert the emulsion, and then 0.9 grams of borax, $Na_2B_4O_7 \times H_2O$ was added to the composition, and the cap was placed on top of the flask, suspending the extraction thimble of silica gel above the stirred liquid.

After 21 hours the composition was filtered to remove the coagulum. The organic liquid was divided into aliquout portions. One portion was analyzed. The other portion was further dried by the addition of 0.20 grams of silica gel per gram of liquid, with mixing for thirty minutes.

The results shown in Table II below were obtained.

$4O_7.10H_2O$ in water was prepared. A 5 milliliter portion was added rapidly to the inverted emulsion in the second flask. Gross agglomeration of the polyvinyl alcohol was observed within five minutes. However, nitrogen stripping was continued for a total of 300 minutes after the addition of the borax solution. In the third test, the nitrogen sweep was begun and additions of borax solution were made dropwise over a 1.5 to 2 minute interval according to the following schedule:

| Additon of Borax Solution | |
|---|---|
| Time (minutes) | Amount |
| 5 | 0.5 ml |
| 45 | 0.5 ml |
| 90 | 0.5 ml |

The following results were obtained:

TABLE III

Borax, $Na_2By_7.10H_2O$, Coagulation of Polyvinyl Alcohol From Frozen Emulsion Sec-Butyl Peroxydicarbonate In Diethylene Glycol Bis (Allyl Carbonate)

| | BREAKING EMULSION | | DRYING | | PRODUCT | | |
|---|---|---|---|---|---|---|---|
| Sample No. | Grams of borax per gram of polyvinyl alcohol | Total Nitrogen Stripping and Coagulation Time (minutes) | Grams of silica gel per gram of monomer | Drying Time (minutes) | Percent recovery of monomer | Sec-Butyl Peroxy Dicarbonate-wt. % | Water wt. % |
| | 0.00* | 705 | N.A. | N.A. | Not measured | 2.8 | Not determined |
| | 0.25 | 300 | N.A. | N.A. | 89.2 | 3.88 | 0.15 |
| | 0.076 | 300 | N.A. | N.A. | 89.9 | 4.61 | 0.13 |

TABLE II

Borax, $Na_2B_4O_7.10\ H_2O$, Coagulation of Polyvinyl Alcohol From Frozen Emulsion Sec-Butyl Peroxydicarbonate In Diethylene Glycol Bis (Allyl Carbonate)

| BREAKING EMULSION | | DRYING | | PRODUCT | | |
|---|---|---|---|---|---|---|
| Grams of borax per gram of polyvinyl alcohol | Coagulation Time (minutes) | Grams of silica gel per gram of monomer | Drying Time (minutes) | Percent recovery of monomer | Sec-Butyl Peroxy Dicarbonate-wt. % | Water wt. % |
| 1.5 | 21 | suspended | 21 hrs. | not det'd. | 1.82 | 0.38 |
| 1.5 | 21 | suspended 0.20 | 21 hrs. 30 min. | not det'd. not det'd. | 1.79 | 0.08 |

EXAMPLE IV

A series of tests were run in which dry nitrogen gas was used to dry the organic phase.

In each test 250 grams of neat PPG CR-39 ® diethylene glycol bis (allyl carbonate) monomer and 25 grams of a particulate frozen emulsion of sec-butyl peroxy dicarbonate and poly (vinyl alcohol) in water, as described in Example I, were mixed in a 500 milliliter wide-mouth Erlenmeyer flask. Then a dry nitrogen gas inlet pipe was inserted into the flask, below the liquid level of the emulsion, and the flask was sealed with a glass wool plugged drying tube, packed with activated silica gel. The mixture was stirred by a magnetic stirrer with simultaneous nitrogen stripping, for about one half hour to one hour to melt the frozen emulsion and form the inverted emulsion.

In the first test, no coagulant was added. A liquid composition containing 5 weight percent borax, $Na_2B$-

No coagulant added.

EXAMPLE V

A test was conducted to determine the simultaneous effects of nitrogen stripping and high shear rate mixing.

A Waring Blender ® jar was utilized as the reaction. A charge of 250 grams of PPG Industries, Inc. CR-39 ® diethylene glycol bis (allyl carbonate) and 25 grams of the sec-butyl peroxy dicarbonate emulsion described in Example I was placed into the Waring Blender ® jar. The jar was covered with a soft cover filled with a 24/40 Claisen adapter and a 12 millimeter addition tube capped with a rubber septum.

Dry nitrogen was introduced into the composition below the surface thereof through a dip tube passing through the straight arm of the Claisen adapter. The wet nitrogen exiting the jar was passed through a silica gel packed "U" tube attached to the other arm of the Claisen adapter.

Agitation and nitrogen feed were continuous. A liquid composition of 5 weight percent borax, $Na_2B_4O_7.10H_2O$ in water was introduced dropwise into the jar over a two minute interval according to the following schedule:

| Addition of Borax Solution | |
|---|---|
| Time (minutes) | Amount |
| 3 | 1 ml |
| 36 | 1 ml |
| 67 | 1 ml |
| 120 | 1 ml |

After 120 minutes the separated organic phase, representing an 89.4 percent recovery of the diethylene glycol bis (allyl carbonate), and contained 3.02 weight percent sec-butyl peroxydicarbonate and 0.26 weight percent water.

The organic phase was mixed with 0.2 grams of silica gel per gram of liquid, agitated for thirty minutes, and filtered. The filtrate contained 0.04 weight percent water.

EXAMPLE VI

A test was conducted to determine the efficacy of boric acid as a coagulant.

A liquid composition was prepared containing 100 grams of PPG Industries, Inc. CR-39 ® diethylene glycol bis (allyl carbonate) and 10 grams of the sec-butyl peroxy dicarbonate emulsion described in Example I. The composition was stirred with a magnetic stirrer to disperse and invert the emulsion.

Thereafter 1.6 grams of boric acid was added to the composition. Stirring was continued for 60 minutes. The composition was then filtered through a coarse fritted funnel. The filtrate contained 2.83 weight percent sec-butyl peroxy dicarbonate and 0.10 weight percent water.

EXAMPLE VII

A test was conducted to determine the efficacy of glyoxal as a coagulant.

A glyoxal solution was prepared by adding 2 milliliters of 1 molar sodium bisulfate, $NaHSO_3$ to 25 milliliters of 40 weight percent glyoxal.

An emulsion was prepared by adding 10 grams of the sec-butyl peroxy dicarbonate frozen emulsion described in Example I to 100 grams of PPG Industries, Inc. CR-39 ® diethylene glycol bis (allyl carbonate), and stirring with a magnetic stirrer to mix and invert the emulsion. The emulsion was broken by adding 1 milliliter of the glyoxal solution to the emulsion, and allowing the composition to sit at 25 degrees Centigrade for 16 hours. The product had a gel-like precipitate, that was easily removed by filtration as described in Example I above.

The filtrate contained 0.27 weight percent water and 3.79 weight percent sec-butyl peroxy dicarbonate.

EXAMPLE VIII

A portion of the composition prepared in Examples V and VII were placed between two glass sheets with a ⅛ inch (3 millimeter) polyvinyl chloride gasket therebetween and cured according to the following cure cycle:

| Cumulative Time (hours) | Temperature, °C. |
|---|---|
| 0 | 42 |
| 4 | 44 |
| 6 | 45 |
| 8 | 47 |
| 10 | 48 |
| 12 | 50 |
| 14 | 52 |
| 16 | 54.5 |
| 18 | 57 |
| 20 | 61 |
| 22 | 69 |
| 23 | 79 |
| 23.6 | 84 |
| 24 | 98 |
| 24.1 | 100 |

Sheets having the properties shown in Table IV, below were obtained:

TABLE IV

| Product of Example | Polymerizate Properties | |
|---|---|---|
| | V | VII |
| Coagulant | Borax | Glyoxal |
| Barcol Hardness (15 second) | 33–27 | 30–22 |
| Percent Transmission | 91.6% | 92.8% |
| Percent Haze | 7.8% | 2.4% |
| ASTM D-1975 Yellowness Index | 3.4 | 2.8 |
| Bayer Abrasion | 4 | 4.2 |

While the invention has been described with respect to certain preferred embodiments and exemplifications, it is not intended to be limited thereby, but only by the claims appended hereto.

I claim:

1. In a method of polymerizing a water insoluble polyol (allyl carbonate) by contacting the polyol(allyl carbonate) with a water insoluble initiator, the improvement comprising:
   (1) forming a composition comprising:
      a. the water insoluble polyol (allyl carbonate), and
      b. an emulsion of the water insoluble initiator, an emulsifier, and water;
   (2) adding a coagulant to the composition whereby to form an aqueous phase coagulum comprising coagulant and water, and an organic liquid phase comprising polyol (allyl carbonate) and initiator;
   (3) separating the coagulum from the organic liquid phase; and
   (4) thereafter forming a polymerizate of polyol(allyl carbonate).

2. The method of claim 1 wherein the emulsifier is a nonionic surfactant.

3. The method of claim 2 wherein the nonionic surfactant is chosen from the group consisting of poly (vinyl alcohol) and poly (alkylene oxides).

4. The method of claim 1 wherein the initiator is an organic peroxide initiator.

5. The method of claim 4 wherein the organic peroxide initiator is a peroxydicarbonate.

6. The method of claim 1 wherein the emlusion of water insoluble initiator, emulsifier, and water comprises from about 30 to about 75 weight percent initiator, an emulsifying amount of emulsifier, and water.

7. The method of claim 6 wherein the emulsion comprises from about 1 to about 10 percent surfactant.

8. The method of claim 6 wherein the continuous phase of the emulsion is the aqueous phase.

9. The method of claim 1 wherein the coagulant is a cross linking agent.

10. The method of claim 9 wherein the coagulant is an inorganic cross linking agent.

11. The method of claim 10 wherein the inorganic cross linking agent is chosen from the group consisting of borax, boric acid, alkali metal tetraborate, alkali metal pentaborates, and alkali metal hexaborate.

12. The method of claim 9 wherein the coagulant is an organic cross linking agent.

13. The method of claim 9 wherein the organic cross linking agent is chosen from the group consisting of polycarboxyls and polycarbonyls.

14. The method of claim 9 wherein the organic cross linking agent is glyoxal.

15. The method of claim 1 comprising adding coagulant under conditions to substantially enhance floc formation and substantially avoid sponge formation.

16. The method of claim 1 wherein the coagulant is chosen from the group consisting of borax and boric acid and the coagulant is polyvinyl alcohol comprising adding from about 0.07 equivalent of borax to about 0.7 equivalent of coagulant per equivalent of poly(vinyl alcohol).

17. The method of claim 1 comprising adding the coagulant substantially uniformly over a period of at least about 2 minutes.

18. The method of claim 17 comprising maintaining the temperature of the liquid composition between about 0 degrees Centigrade and 35 degrees Centigrade while adding the coagulant thereto.

19. The method of claim 1 comprising drying the water wet organic liquid phase.

20. The method of claim 19 in which drying is carried out by contacting the water wet organic phase with a desiccant.

21. The method of claim 20 wherein the desiccant is silica gel.

22. The method of claim 21 wherein the concentration of desiccant is from about 5 to 35 weight percent, basis weight of the organic liquid.

23. The method of claim 19 comprising passing a substantially dry, non-reactive gas through the water wet, organic liquid phase.

24. The method of claim 23 wherein the gas is chosen from the group consisting of nitrogen, argon, helium, carbon dioxide, and mixtures thereof.

* * * * *